United States Patent [19]

Sheldrick et al.

[11] Patent Number: 5,506,904
[45] Date of Patent: Apr. 9, 1996

[54] SYSTEM AND METHOD FOR TRANSMITTING AND RECEIVING VARIABLE LENGTH AUTHORIZATION CONTROL FOR DIGITAL SERVICES

[75] Inventors: Wayne S. Sheldrick, Scarborough; Keith B. Gammie, Markham; Arthur S. Woo; Gary W. C. Chan, both of Scarborough, all of Canada

[73] Assignee: Scientific-Atlanta, Inc., Norcross, Ga.

[21] Appl. No.: 160,830

[22] Filed: Dec. 3, 1993

Related U.S. Application Data

[63] Continuation-in-part of Ser. No. 101,974, Aug. 4, 1993, Pat. No. 5,381,481.

[51] Int. Cl.$^6$ ....................................................... H04L 9/32
[52] U.S. Cl. .................................. 380/23; 380/9; 380/10; 380/25; 380/49
[58] Field of Search ................................. 380/9, 10, 20, 380/23, 25, 49, 50

[56] References Cited

U.S. PATENT DOCUMENTS

| | | | |
|---|---|---|---|
| 4,077,005 | 2/1978 | Bishop | 380/49 |
| 4,536,791 | 8/1985 | Campbell et al. | 380/10 |
| 4,587,514 | 5/1986 | Schas et al. | 341/87 |
| 4,652,903 | 3/1987 | Lucas | 348/489 |
| 4,697,277 | 9/1987 | van Rassal | 375/116 |
| 4,723,283 | 2/1988 | Nagasawa et al. | 380/20 |
| 4,763,357 | 8/1988 | Barr | 380/48 |
| 4,787,085 | 12/1988 | Suto et al. | 370/110.1 |
| 4,817,142 | 3/1989 | van Rassal | 380/15 |
| 4,829,569 | 5/1989 | Seth-Smith et al. | 380/10 |
| 4,860,352 | 8/1989 | Laurance et al. | 380/23 |
| 4,866,770 | 9/1989 | Seth-Smith et al. | 380/20 |
| 4,890,321 | 12/1989 | Seth-Smith et al. | 380/20 |
| 4,962,449 | 10/1990 | Schlesinger | 380/25 X |
| 4,994,909 | 2/1991 | Graves et al. | 348/7 |
| 5,062,105 | 10/1991 | McKnight et al. | 370/84 |
| 5,200,823 | 4/1993 | Yoneda et al. | 348/473 |
| 5,243,652 | 9/1993 | Teare et al. | 380/23 X |

OTHER PUBLICATIONS

"Requirements and Method for High–Level Multiplexing of MPEG and Other Digital Service Bitstreams with Universal Transport Layer", Anthony J. Wasilewski; Scientific–Atlanta, Inc., GA; (1992).

"Syntax Proposal for MPEG–2 Transport Steam Program Specific Information Contribution to Systems", Anthony J. Wasilewski; Scientific–Atlanta, Inc. GA; (Jul. 1993).

*Primary Examiner*—Bernarr E. Gregory
*Attorney, Agent, or Firm*—Banner & Allegretti, Ltd.

[57] ABSTRACT

Authorization information, such as blackout and spotlight regions, circular blackout and spotlight regions, and tier pointers, may be transmitted from an encoder to a decoder in a plurality of sessions of data frames. By spreading the authorization information over a plurality of sessions, more space may be allocated for the provision of services. In addition, the authorization information may be framed by START and STOP fields so that the length of authorization information may be variable. Calculation of a circular blackout/spotlight region can be simplified by transmitting a distortion factor from the encoder to the decoder. Accordingly, complex calculations need not be performed at a microprocessor in the decoder.

34 Claims, 12 Drawing Sheets

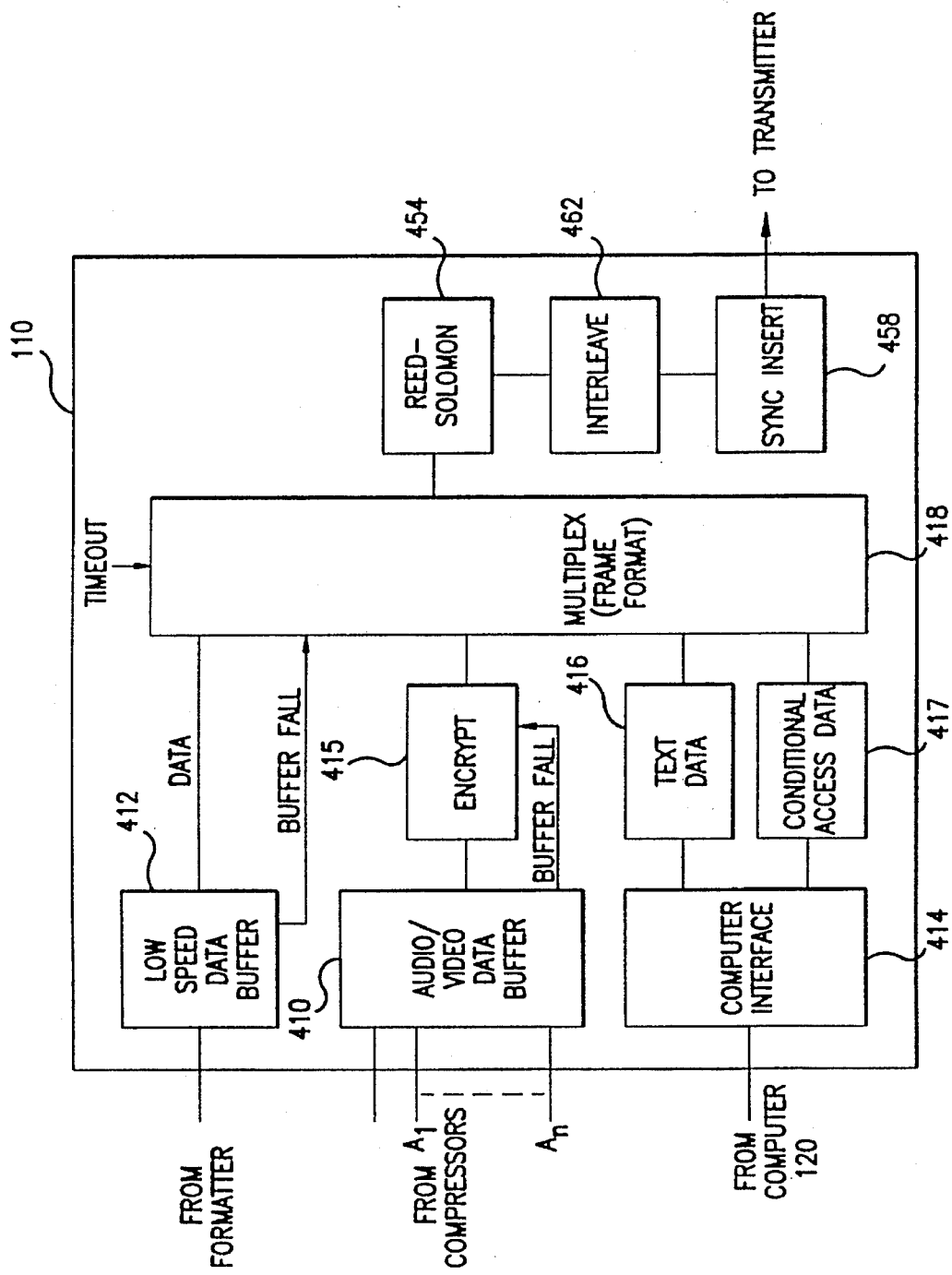

| FIELD DESCRIPTION | BITS | |
|---|---|---|
| HEADER ID = $2x | 8 | H |
| VIRTUAL CHANNEL NUMBER | 12 | H |
| SPARE | 4 | - |
| SPARE A | 3 | - |
| SERVICE CATEGORY | 5 | - |
| SPARE B | 2 | - |
| SERVICE NUMBER | 6 | - |
| VIDEO/RADIO/TEXT TIER POINTER | 8 | E |
| FORCE TRACKING OF PROGRAM | 1 | E |
| INVERSE TIER AUTHORIZATION | 1 | E |
| DATA SERVICE TIER POINTER | 6 | E |
| RTC PURCHASE ENABLE | 1 | E |
| RTC ENABLE | 1 | E |
| RIGHT-TO-COPY (RTC) TIER POINTER | 6 | E |
| PPV ENABLE | 1 | E |
| CYLINDER DATA ID BIT | 1 | E |
| PROGRAM NUMBER | 14 | E |
| RTC COST | 8 | E |
| EVENT COST | 16 | E |
| FORCED TRACKING DELAY | 4 | E |
| ENCRYPTED CYCLE COMMAND | 4 | E |
| ENCRYPTED CYCLE DATA | 24 | E |
| WAIT FOR BLACKOUT/SPOTLIGHT AUTHORIZATION CYCLE | 1 | E |
| WAIT FOR VIDEO/RADIO/TEXT TIER POINTER CYCLE | 1 | E |
| REASSIGN VIDEO CHANNEL TO DATA | 1 | E |
| PHYSICAL VIDEO CHANNEL | 5 | E |
| EMBEDDED AUDIO CHANNEL ENABLED | 1 | E |
| REASSIGN AUDIO CHANNEL TO DATA | 1 | E |
| PHYSICAL AUDIO CHANNEL | 6 | E |
| HDTV PORT | 1 | E |
| FINGERPRINT TRIGGER | 1 | E |
| REASSIGN VIDEO CHANNEL # 2 TO DATA | 1 | E |
| PHYSICAL VIDEO CHANNEL # 2 | 5 | E |
| EMBEDDED AUDIO CHANNEL # 2 ENABLED | 1 | E |
| REASSIGN AUDIO CHANNEL # 2 TO DATA | 1 | E |
| PHYSICAL AUDIO CHANNEL # 2 | 6 | E |
| FREE/PREVIEW TIME | 4 | E |
| PHYSICAL UTILITY DATA CHANNEL | 4 | E |
| PHYSICAL TEXT SERVICE NUMBER | 5 | E |
| STARTING TEXT SERVICE PAGE NUMBER | 11 | E |
| PORT CONTROL PINS | 8 | E |
| SPARES | 5 | E |
| MATURITY RATING | 3 | E |
| SPARES | 40 | E |
| PACKET CHECK (REPEAT VIRTUAL CHANNEL NUMBER + SPARE) | 16 | E |
| TOTALS | 256 | E |

H — MEANS THAT THIS FIELD IS FIXED AT THIS POSITION AND SIZE BY THE HARDWARE
E — MEANS THIS FIELD IS ENCRYPTED

FIG.4

| CYCLING DATA NAMES | CMD NO. | DESCRIPTION OF 24 BIT DATA FIELD | | |
|---|---|---|---|---|
| | | BYTE 0 (MS) | BYTE 1 | BYTE 2 (LS) |
| START/STOP | 0 | CYCLE TYPE | LENGTH | CHECKSUM |
| BLACKOUT | 1 | MS BLACKOUT | LS BLACKOUT | SPARE |
| SPOTLIGHT | 2 | MS SPOTLIGHT | LS SPOTLIGHT | SPARE |
| BLACKOUT LOC 1 | 3 | MS CENTER LAT | LS CENTER LAT | SPARE |
| BLACKOUT LOC 2 | 4 | RADIUS | MS CENTER LNG | LS CENTER LNG |
| SPOTLIGHT LOC 1 | 5 | MS CENTER LAT | LS CENTER LAT | SPARE |
| SPOTLIGHT LOC 2 | 6 | RADIUS | MS CENTER LNG | LS CENTER LNG |
| TIER POINTER | 7 | TIER 1 | TIER 2 | TIER 3 |

FIG.5

| | | |
|---|---|---|
| 0 | STOP CYCLE | STOPS ANY CYCLE AND EXECUTES IT. LS BYTES CONTAINS A CYCLE CHECKSUM |
| 1 | BLACKOUT START | INDICATES THAT THE DECODERS ASSUME TO BE AUTHORIZED UNLESS THERE IS A BLACKOUT CODE MATCH. MIDDLE BYTE IS THE LENGTH OF THE CYCLE. |
| 2 | SPOTLIGHT START | INDICATES THAT THE DECODERS ASSUME TO BE DEAUTHORIZED UNLESS THERE IS A SPOTLIGHT CODE MATCH. MIDDLE BYTE IS THE LENGTH OF THE CYCLE. |
| 3 | TIER POINTER START | STARTS THE ACCUMULATION OF THE TIER WORDS. MIDDLE BYTE IS THE LENGTH OF THE CYCLE. |
| 4-255 | NOT USED | |

FIG.6

| FIELD DESCRIPTION FOR PACKET DATA | BITS |
|---|---|
| COMMAND CODE = 6 (SET = 3) | |
| STORE BLACKOUT CODES | 1 |
| STORE DECODER LOCATION | 1 |
| USE DECODER LOCATION | 1 |
| CREDIT LIMIT UPDATE ENABLE | 1 |
| STORE AND FORWARD MODE | 1 |
| SPARE | 3 |
| BLACKOUT CODE #1 | 16 |
| BLACKOUT CODE #2 | 16 |
| BLACKOUT CODE #3 | 16 |
| BLACKOUT CODE #4 | 16 |
| DECODER LOCATION − LATITUDE | 16 |
| DECODER LOCATION − LONGITUDE | 16 |
| DECODER LATITUDE COMPENSATION | 8 |
| CREDIT LIMITS | 16 |
| SPARE | 40 |
| TOTAL | 168 |

FIG. 7

SYSTEM AND METHOD FOR TRANSMITTING AND RECEIVING VARIABLE LENGTH AUTHORIZATION CONTROL FOR DIGITAL SERVICES

This application is related by subject matter to U.S. patent application Ser. No. 08/161,160, entitled "System and Method for Transmitting a Plurality of Digital Services Including Imaging Services" and filed Dec. 3, 1993; U.S. patant application Ser. No. 08/160,828, entitled "System and Method for Transmitting a Plurality of Digital Services Including Compressed Imaging Services and Associated Ancillary Data Services" and filed Dec. 3, 1993; U.S. patent application Ser. No. 08/160,841, entitled "Memory Efficient Method and Apparatus for Synch Detection" and filed Dec. 3, 1993, now U.S. Pat. No. 5,420,640 U.S. patent application Ser. No. 08/161,159, entitled "A multi-Service Data Receiver Architecture" and filed Dec. 3, 1993; U.S. patent application Ser. No. 08/160.848, entitled "System and Method for Simultaneously Authorizing Multiple Virtual Channels " and filed Dec. 3,1993, now U.S. Pat. No. 5,425,101; U.S. patent application Ser. No. 08/160,827, entitled "System and Method for Providing Compressed Teletext Services and Teletext Support Services" and filed Dec. 3, 1993; and is a continuation-in-part of U.S. patent application Ser. No. 08/101,974, entitled "Method and Apparatus for Uniquely Encrypting a Plurality of Services at a Transmission Site" and filed Aug. 4, 1993, now U.S. Pat. No. 5,380,481.

I. BACKGROUND OF THE INVENTION

A. Field of the Invention

The present invention relates generally to digital signal transmission, and more particularly, to a system and method for transmitting control information together with a multiplex of digital services, including imaging services, for selective display of the services at a plurality of remote locations.

B. Description of the Relevant Art

With the growing trend toward a merger of the previously separate technologies of telecommunications including voice and data telecommunications and television including satellite, broadcast and cable television, there has emerged an increased interest in developing adaptable transmission systems capable of handling any one or more of a collection or plurality of such services. The primary media investigated for providing such services to date comprise, for example, coaxial cable, land-based microwave, so-called cellular radio, broadcast FM, broadcast satellite and optical fiber, to name a few.

Each media has its own characteristics. For example, comparing cable and satellite for digital data transmission, cable tends to have a medium error rate, but, when errors appear, the errors come in long bursts. Satellite as a media has a pretty poor error rate, primarily due to the requisite weak signal power, and hence, low signal to noise ratio. In satellite, then, the poor error rate is specially corrected utilizing such techniques as convolutional error correctors, not required in a cable environment.

In copending U.S. application Ser. No. 07/968,846 filed Oct. 30, 1992 and entitled "System and Method for Transmitting a Plurality of Digital Services," now U.S. Pat. No. 5,400,401, there is described an encoder for generating a multiplexed data stream carrying services to remote locations via, for example, a satellite or a cable distribution network. The generated data stream comprises a continuous sequence of frames, each frame comprising two fields, and each field comprising a plurality of lines. A first group of lines of a field defines a transport layer and a second group of lines defines a service data region. A feature of the disclosed scheme is the ability to dynamically vary the multiplexed data stream from field to field. A further feature of the disclosed scheme is that the data transmission rate of the multiplexed data stream is related to the frequency of known analog video formats, i.e. frame, field and horizontal line rates.

In U.S. application Ser. No. 07/970,918 filed Nov. 2, 1992, entitled "System and Method for Multiplexing a Plurality of Digital Program Services for Transmission to Remote Locations," now U.S. Pat. No. 5,319,709, there is described another system, this for multiplexing a plurality of digital program services comprising a collection of, for example, video, audio, teletext, closed-captioning and "other data" services. According to the disclosed scheme, a plurality of subframe data streams are generated, each having a transport layer region and a program data region. These subframe data streams are then multiplexed together into superframes having a transport layer region and a subframe data region.

While these disclosed transmission systems permit a variety of services to be transmitted over various media to remote locations, there remains a need to provide yet other alternative arrangements more particularly adapted to the wide variety of services that may be offered over various media and permit the end user at the remote location greater flexibility over the data content the user is ultimately enabled to receive. Moreover, such a system should be able to be easily adapted to transmit an increasing number of different services in an increasingly efficient manner, for example, utilizing the same or less bandwidth.

When such a variety of services are transmitted, it is desirable for system operators to exert various forms of authorization control over the services transmitted to a user. By using authorization control, the system operator can make a set of services available to some users but not to others. The forms of authorization control desired by the system operators may differ depending on a classification of the service provided, a classification of the user receiving the service, or both.

Such authorization control includes implementation of a blackout, whereby one or more services are denied to a user according to a predetermined classification. For example, broadcasters may be prohibited by contract from broadcasting a sporting event to users within a fixed distance from the stadium, arena, or track where the sporting event takes place in order to protect ticket revenues. In current systems, the decoder at the user's location calculates whether a blackout is required according to a complicated, three-dimensional mathematical algorithm. Of course, the decoder must be equipped with a processor capable of performing the calculations. If such a processor is already provided in the decoder, the processor must be diverted from other jobs to perform the complex calculations necessary to determine whether the decoder is within the blackout area. Accordingly, the speed of processing is reduced.

Users may also be classified for blackout purposes by region, for example, by city or county. This regional blackout authorization control is currently available in certain B-MAC (B-type Multiplexed Analog Component) products. Spotlighting is another type of authorization control where one or more services are provided only to a predetermined class of users. Thus, spotlighting may be considered as the inverse of blackout.

The group authorization is implemented as follows. Each decoder is sent an addressed data packet which specifies the group to which the decoder belongs. System data includes seeds and control information, and two bytes are used to send CSACS packets. CSACS packets send the entire authorization stream in a list of group codes. If a decoder is a member of a listed group, it uses the CSACS package authorization description. If the decoder is not a member of the listed groups, it is not authorized. Accordingly, a blackout can be implemented by removing a group to be blacked out from the transmitted list.

Over several sessions, control such as audio routing and mute controls, data mute control, video on/off, etc. is transmitted via the CSACS method of group authorization so as to extend the available bits of system data. However, this information would be sent in one session if allowed by the system data. In addition, as indicated above, reception of a CSACS cycle was required to make authorization possible.

Authorization control may also be used by the broadcaster to offer a variety of service packages to users at different prices. This is called tiering, and the various service packages available to users are called tiers. In B-MAC applications, a single tier pointer is transmitted. The tier pointer references a bit string in the decoder. If the bit pointed to by the tier pointer is in a first state, authorization occurs. If the bit pointed to is in a second state, authorization is denied.

The operator is afforded maximum flexibility if the system can support numerous authorization control schemes. However, as more authorization control schemes are provided, an increasing portion of the transmitted signal must be dedicated to authorization control information. As a result, less capacity is available for the transmission of services. In addition, a significant amount of time may be needed for a decoder to decrypt authorization control information encrypted by the broadcaster at an encoder. Furthermore, the need for certain authorization schemes may vary over time as conditions change. Therefore, an operator may waste a significant portion of transmission bandwidth by providing for authorization control schemes that are not in use.

II. SUMMARY OF THE INVENTION

It is an object of the present invention to provide a highly flexible system and method for delivering authorization information to a decoder at a user's location.

It is a further object of the present invention to provide a system and method for delivering authorization information to a decoder at a user's location without adversely affecting the bandwidth available for services, such as video and audio, and without increasing the time required to decrypt the information in a security microprocessor.

It is a further object of the present invention to provide a system and method for delivering a variable number of bytes of authorization information to a decoder without adversely affecting the bandwidth available for services and without increasing decryption time.

It is a further object of the present invention to provide a system and method for implementing a circular blackout and/or spotlight authorization that may be easily and efficiently determined at a decoder.

The above objects and others are achieved by the present invention in which a plurality of authorization codes, for example, circular blackout codes, group blackout codes, spotlight codes, and a list of program tier pointers, are transmitted from an encoder to a decoder in fields of a plurality of data frames. The data frames containing the authorization codes are framed by start and end bytes. Frames that do not include authorization data may be interposed between data frames that contain authorization data. Thus, the authorization codes may be transmitted in a plurality of cycles of frames. Each of the fields must be completely received from start to end without errors or omissions in order for the authorization to be implemented. Other authorization schemes may be implemented in addition to those in the frame cycles. Accordingly, the authorization schemes in the cycle of frames can be supplemental to those not in the cycle of frames, and authorization may be achieved without transmission of the authorization in the cycle of frames.

By spreading the authorization codes out over a plurality of data frames, fewer bytes of the data frame may be allocated for authorization control thereby allowing greater capacity for the provision of services. Decryption time is not increased because the decoder may decrypt the authorization code bytes one frame at a time. Further, by framing the authorization codes with start and stop bytes, authorization codes having a variable length and content may be transmitted and received. Accordingly, the need for variable length packets of control information is eliminated without destroying the capability of transmitting variable length control information.

In addition, the circular blackout/spotlight codes specify a circular region in terms of a center latitude, a center longitude, and a radius. A particular decoder receiving stores its location in terms of longitude and latitude. Further, a distortion factor is stored to effect a two-dimensional calculation of whether the decoder is in the circular region that approximates the much more complicated three-dimensional calculation. The two-dimensional calculation requires fewer arithmetic operations than the prior art three-dimensional algorithms discussed above. Accordingly, less processor time is consumed in making the blackout/spotlight determination at the decoder. Finally, the present invention is highly flexible in that, among other features described above, it need not be used in connection with each programming service.

The present invention may be implemented in a system for multiplexing a plurality of digital service data streams at varying data rates and transmitting the services from an origination point to a plurality of remote locations. A digital service may comprise a collection selectable by the user from any of a number of low data rate, medium data rate and high data rate services including, but not limited to, video (both standard and high resolution), audio (from monaural to "surround-sound"), and data (from subscription software to video games to high speed data-base exchanges).

The present invention is described primarily in the context of a pay television system such as a cable television or direct broadcast satellite system (DBS), that typically distribute a variety of program services to subscribers for presentation on home terminal equipment which is the property of the end user or subscriber to the pay services. Such home terminal equipment may comprise video game apparatus, a television signal receiver (either standard or high definition), a home computer, a printer (either a facsimile or high resolution image printer), a stereo sound system, a telephone (including portable, mobile or stationary), a picture-phone, an energy system or alarm equipment interface, or any other known such apparatus or combination of apparatus. The present invention is also envisioned to be used in the telecommunications environment or other fixed or switched one-way or two-way program apparatus. It will be assumed, however, that such services be converted, if not already in digital form, to digital form for transmission over the present system.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

FIG. 3B is a detailed schematic block diagram of a multiplexer 110 of FIGS. 1 or 3A according to the present invention for outputting multiplexed data according to the multiplex frame format of FIGS. 2A, 2B and 2C.

FIG. 4 depicts a data structure for a virtual channel packet according to an embodiment of the present invention.

FIG. 5 depicts a data structure and command types for encrypted data according to an embodiment of the present invention.

FIG. 6 depicts a variety of encrypted cycling data and their corresponding functions for an embodiment of the present invention.

FIG. 7 depicts a data structure for an addressed data packet (ADP) that transmits authorization codes according to an embodiment of the present invention.

DETAILED DESCRIPTION OF THE DRAWINGS

Figure 1:
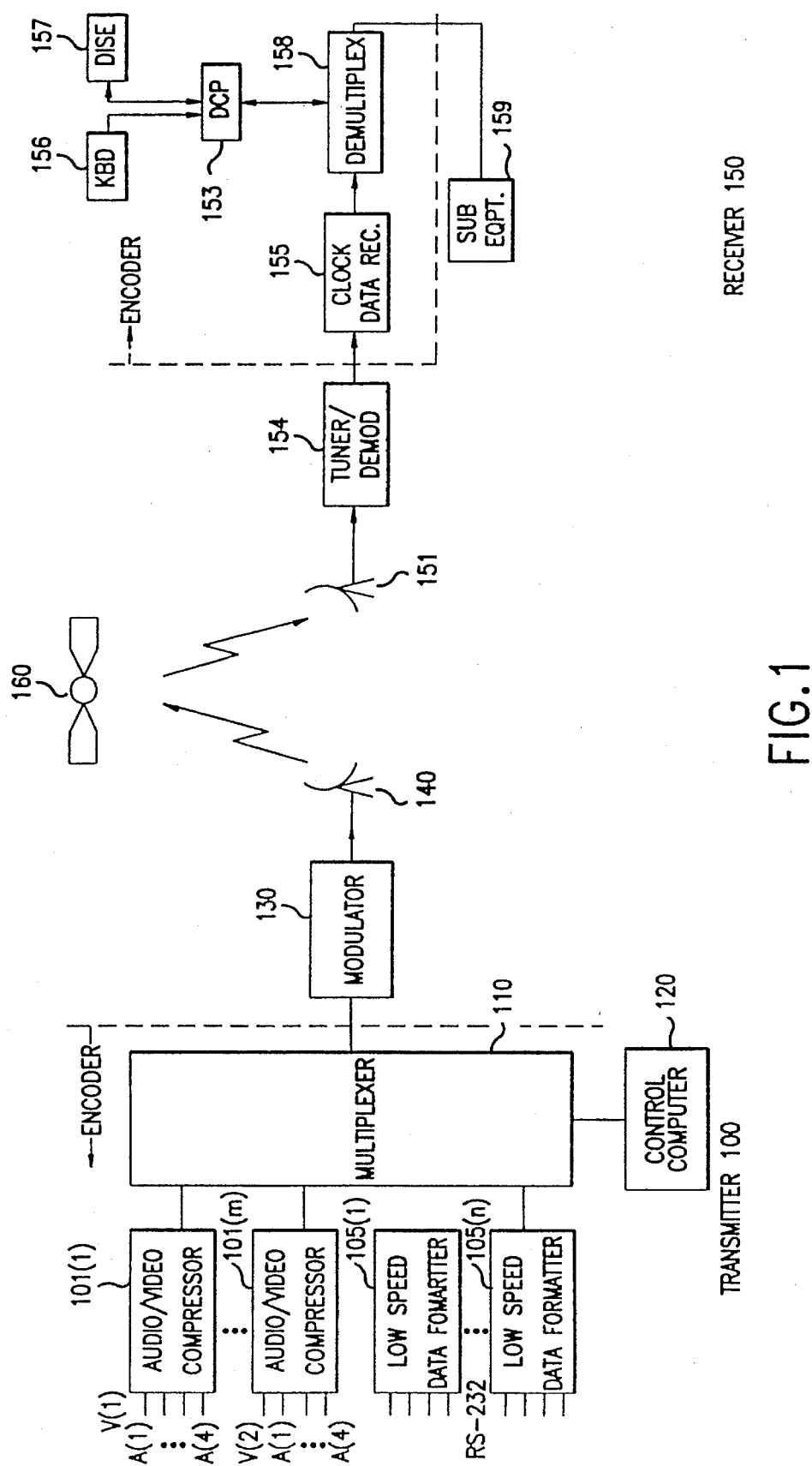
FIG. 1 is a system block diagram showing a transmitter site 100 including an encoder and a receiver site 150 including a decoder according to the present invention for transmitting control, low data rate, medium data rate (audio) and high data rate (video) data implemented in a satellite communications system.

FIG. 1 shows a transmitter site 100 including an encoder and a receiver site 150 including a decoder according to the present invention applied in the environment of a satellite communications system. Audio/video compressor circuits 101(1) to 101(m) are shown for individually receiving audio service data and/or video service data, for example, from a plurality of programmers providing such services. One such MPEG video compressor known in the art is a National Transcommunications, Ltd. (England) NTL 2000 V compressor. Similarly, a plurality of low data rate services, for example, RS232 digital data, are received at low speed data formatters 105(1) to 105(n). The audio video compressors compress the received medium and high data rate data in accordance with known algorithms (for example, in accordance with currently known or proposed standards such as MPEG I or II, audio or video, in particular, for example, ISO 11171 or ISO 13818).

Control computer 120 supplies control information, preferably as data packets, to the multiplexer 110. For example, the data packets may be constructed by the control computer according to specified formats responsive to the entry of appropriate instructions into control computer 120. Accordingly, the operator can control the various modes of authorization made available by the present invention. The specific information required by the decoder to implement authorization modes and the data structure by which this information can be transmitted is discussed in greater detail below.

In addition, control computer 120 controls multiplexer 110 to time division multiplex the compressed medium and high data rate streams output from compressors 101(1) to 101(m) and the low data rate streams output from formatters 105(1) to 105(n) into a serial data stream for output to modulator 130. The high speed data link connecting multiplexer 110 and modulator 130 may be coaxial cable, optical fiber or twisted pair, so long as the transmission is relatively noise free and at sufficient data rate. In a preferred, but nonetheless nonlimiting, embodiment the control information and the data streams are encrypted. Modulator 130 then modulates the multiplexed digital data stream on to a carrier and up converts the carrier as necessary for transmission via, for example, C or Ku band frequencies through a satellite antenna 140. Modulator 130 may preferably comprise a quadrature phase shift key modulator known in the art for satellite transmission. Satellite antenna 140 beams a signal including the modulated data to satellite 160 which may be functionally referred to as a transponder. Transponder 160 simply repeats the received signal toward earth and satellite receiver antenna 151.

Receiver site 150 typically includes a tuner/demodulator 154 for selecting one of a plurality of channels to which satellite tuner/demodulator 154 may be tuned. Tuner/demodulator 154 down converts and outputs a demodulated data stream to clock and data recovery circuit 155. Clock and data recovery circuit 155 in turn outputs an error corrected data stream and synchronization data to demultiplexer 158. Additional details concerning a suitable clock and data recovery may be obtained from U.S. patent application Ser. No. 08/160.839, entitled "Method and Apparatus for Locating and Tracking a QPSK Carrier", filed Dec. 3, 1993 and incorporated herein by reference, now abandoned. A user may input a selected channel via a selector (hereinafter referred to as KBD) 156, e.g. remote control or using push buttons on a panel thereof, keypad, etc. The channel selection information is sent to display control processor (DCP) 153.

Under the control of DCP 153, the demultiplexer 158 extracts control information corresponding to the selected channel from the received data. The DCP 153 then reads the control information out of the demultiplexer 158. The control information may be encrypted as discussed above and may include authorization information. Accordingly, the DCP supplies the encrypted control information to digital compression in-board security element (DISE) 157. DISE 157 decrypts the control information and determines whether the decoder is authorized to receive the selected channel. If so, the DISE 157 supplies to the demultiplexer 158 via DCP 153 decryption information for decrypting the data corresponding to the selected channel and information concerning the location of the selected channel data in the multiplexed data.

DISE 157 preferably comprises a secure microprocessor including on-board read only memory (ROM) and random access memory (RAM). One such secure microprocessor may be a Motorola MC68HC05SC27. Alternatively, one may use a Motorola MC68HC05SC21, which is referred to in U.S. patent application Ser. No. 08/101,974, entitled "Method and Apparatus for Uniquely Encrypting a Plurality of Services at a Transmission Site", incorporated herein by reference Certain other security elements are discussed in U.S. Pat. Nos. 5,029,207 and 5,237,610, both incorporated herein by reference.

The demultiplexer 158, responsive to the information output by DISE 157, locates, demultiplexes (i.e., extracts), and decrypts the data streams corresponding to the selected channel and then provides the demultiplexed data streams to various output ports to subscriber equipment 159 via peripheral data processors 152. In one preferred embodiment the demultiplexer may be an application specific integrated ciruit (ASIC). Further details concerning the operation of the demultiplexer 158 and the peripheral data processors 152 may be obtained from U.S. patent application Ser. No.08/161,159, entitled "A Multi-Service Data Receiver Architecture", filed Dec. 3, 1993 and which is incorporated herein by reference. In addition, further details concerning encryption and decryption, among other things, may be found in U.S. patent application Ser. No. 08/101,974, entitled "Method and Apparatus for Uniquely Encrypting a Plurality of Services as a Transmission Site", which is incorporated herein by reference.

The user or subscriber equipment may comprise, for example, standard or high definition television reception equipment, digital audio reception equipment, digital data processors or computers, video game equipment, facsimile receiver/printers, energy management equipment and the like.

The receiver site 150 may not only be a subscriber to services but may be a provider of services such as a cable television system operator. In such a scenario, the receiver site 150 may not include typical subscriber equipment 159 but may include cable television system headend equipment known in the art including television modulators and digital audio service providing equipment and the like.

Figure 2A:
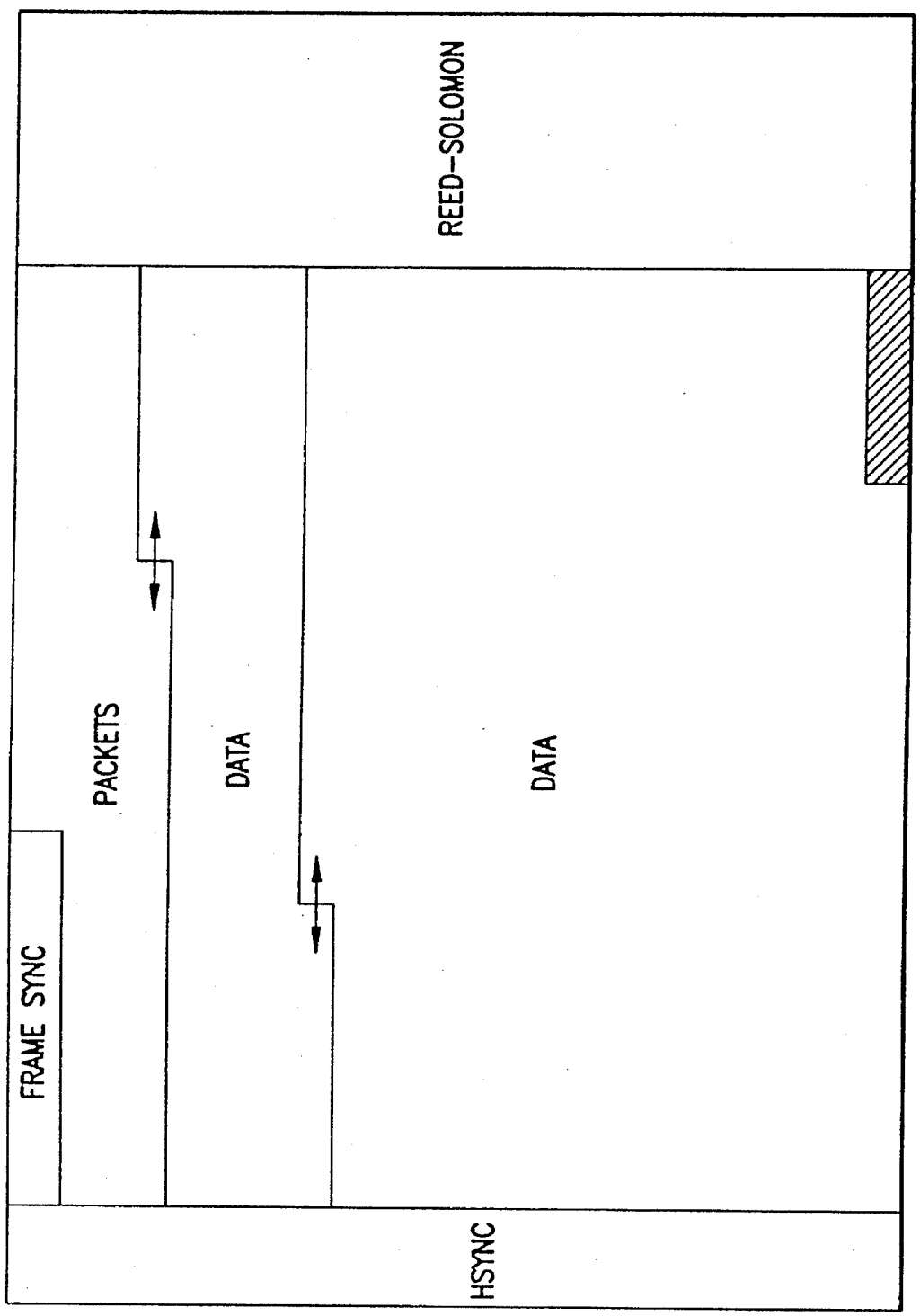
FIG. 2A is a diagram showing a scalable multiplex frame, including synchronization words BLOCK SYNCH (also referred to herein as HSYNCH) and FRAME SYNCH, for transmitting a digital data stream of low data rate (included within PACKETS), medium data rate (audio) and high data rate (video) data protected by Reed-Solomon encoding according to the present invention.

Referring now to FIG. 2A, there is shown a generic frame having highly flexible characteristics. However, it will be recognized that the present invention may be practiced in connection with other data frame structures, whether they are more flexible or less flexible than that described below, without significantly diminishing the advantages of the present invention. The static or fixed elements of the depicted scalable multiplex according to the present invention are BLOCK SYNCH (or HSYNCH) and FRAME SYNC. All other depicted elements of the frame are flexible and may change from medium to medium and from frame to frame. For example, Reed-Solomon error correction parity data may be provided for satellite transmission and omitted for less error prone forms of media.

PACKETS data comprises control information, including authorization control information, as well as low speed data services. Moreover, the delineation between what is shown as PACKETS data and areas for medium speed (audio) and high speed (video) data portions are flexible, and the figure is not intended to show that the boundaries between such forms of data is fixed at any one point in the frame. A predetermined structure is provided to the frame in that FRAME SYNCH follows the first byte of HSYNCH in a frame according to the present invention. PACKETS data follows FRAME SYNCH, followed in turn by medium speed (audio) and high speed (video) data in that order. There will always be some PACKETS data for control purposes but depending on the priorities of data services to be transmitted there may not exist low speed data portions thereof, medium speed data sections or high speed data sections of a particular frame. A more detailed discussion of the data frame structure is found in U.S. patent application Ser. No. 08/161,160, entitled "System and Method for Transmitting a Plurality of Digital Services Including Imaging Services," filed Dec. 3, 1993 and which is incorporated herein by reference. Further details concerning HSYNCH and FRAME SYNCH determination and recovery at a receiver may be found in U.S. application Ser. No. 08/160,841, entitled "Memory Efficient Method and Apparatus for Synch Detection," filed Dec. 3, 1993 and incorporated herein by reference, now U.S. Pat. No. 5,420,640.

The term PACKETS is intended to refer to a collection of, for example, control or system data blocks which are intended to signal or control a receiver to, for example, identify the data types or data services and the respective data beginning and ending boundaries to follow. The control data blocks may serve to limit the variety of services available to an end user as well as provide a basis upon which the end user may control his receiver to receive and output data services as he chooses. In other words, according to some applications, the user's selection of services may be limited by their on-hand equipment and their preferences to particular ones of the authorized services in particular arrangements of the various multiplexed data streams or blocks that follow in the data stream.

Low speed data refers to teletext, facsimile, conditional access, alarm, energy management, certain audio and other data streams which typically exhibit data rates of less than sixty-four kilobytes per second. Medium speed data refers to more sophisticated forms of audio such as "surround-sound" and medium speed data rates between, for example, 64 kilobytes per second and T1 carrier or D1 (telecommunications) rates of approximately one megabit per second. High speed data refers to some compressed forms of video transmission up to data rates required for high definition color television, be it in a MUSE, European, so-called Grand Alliance proposed U.S. format or other HDTV format. Such a structure is not intended to be fixed; for example, the present suggested data rates may be broken into only two regions of low and high speed data. Nevertheless, for example, low speed data will always be included within PACKETS data and precede higher speed data sections of the frame, and high speed data will always follow slower speed data and precede the first HSYNCH and FRAME SYNCH words for the next frame.

The size of a particular frame is dictated by the transmission medium and the data to be carried. One of the features of the present invention is a minimization of the number of bytes utilized for authorization of services and a maximization of the payload or information data portions of the frame. Thus, transmitter power and signal to noise objectives are achieved along with information payload maximization. Then, large frames are inherently more efficient, and there is an improved tolerance of long burst errors, for example, in a cable or satellite environment. Other factors weigh against the choice of too large a frame. These include the speed of achieving synchronization at a receiver and the cost of error correction circuitry such as memory costs at a receiver site.

In an error-prone environment, error protection is provided by a Reed-Solomon block code denoted REED-SOLOMON and appearing in FIG. 2A as a narrow but long rectangular column at the right of the figure. As is shown in either FIG. 2A or 2B, the Reed-Solomon block code is appended to the information data bytes as forward error correction (FEC) parity bytes. The proportion of FEC bytes to information bytes is on the order of from one to ten per cent depending on the particular medium or mixture of media or application. Interleaving, wherein bytes of a number of blocks grouped in the depicted frame are shuffled between blocks according to a predetermined algorithm known to transmitter and receiver alike, may be employed to provide additional protection against extended bursts of errors. Further information concerning interleaving may be found in U.S. patent application Ser. No. 08/161,160, entitled "System and Method for Transmitting a Plurality of Digital Services Including Imaging Services," filed Dec. 3, 1993 and which is incorporated herein by reference.

A nearly square, but not perfectly square, frame is preferred and thus the practical maximum limit on the vertical dimension is about 512 lines or blocks. In keeping with such considerations and practical limitations on typical media bandwidths, a practical maximum number of video services is on the order of thirty-two and on concurrent audio services, sixty-four, assuming video and audio data compression is utilized without greatly sacrificing received signal resolution.

Figure 2B:
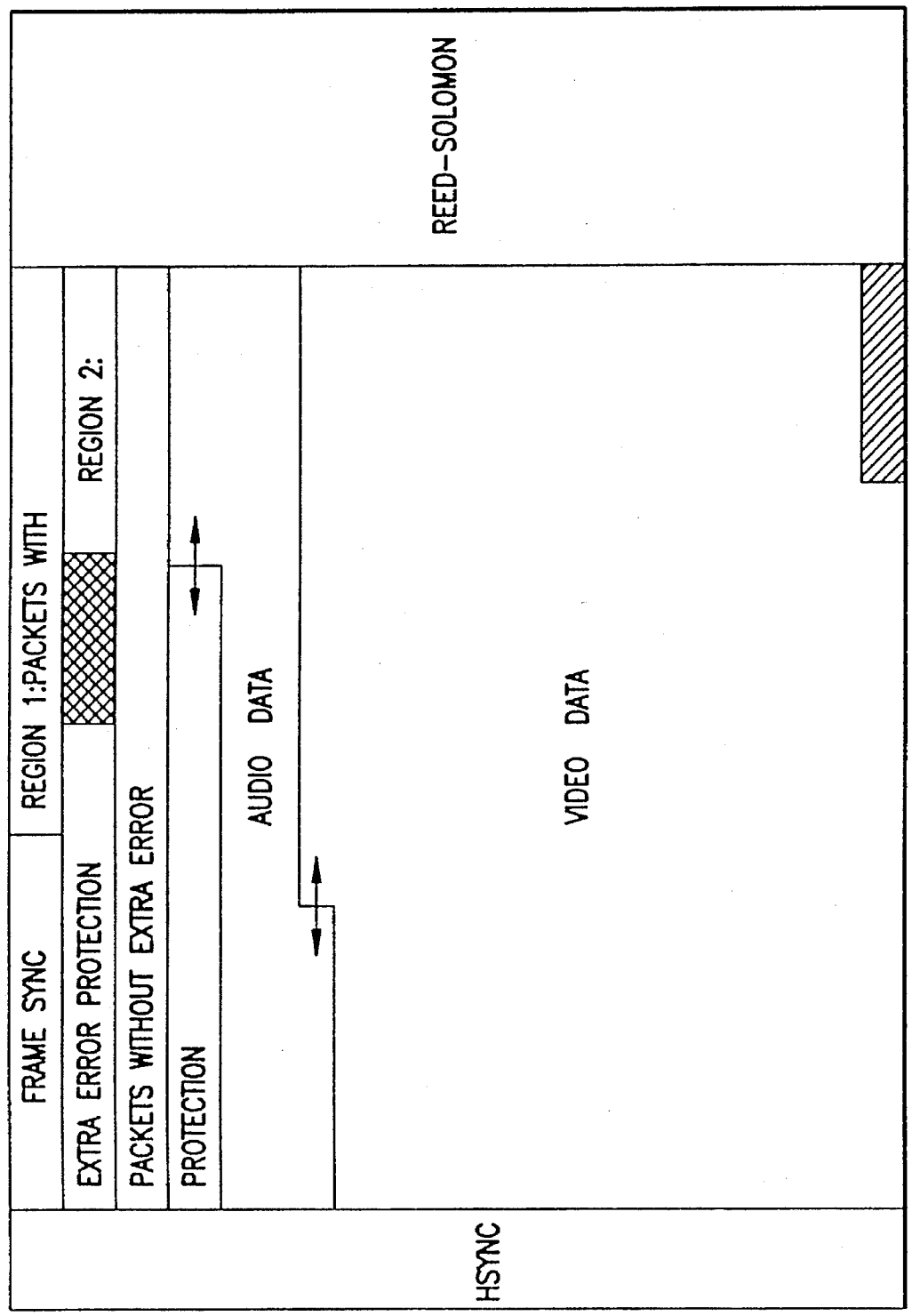
FIG. 2B is a second diagram of the frame of FIG. 2A wherein the PACKETS area is further broken down into first and second regions, the first region including packets with extra error protection and the second region including data protected only by Reed-Solomon encoding.

PACKETS data follows the FRAME SYNC word in the frame. Certain PACKETS data is utilized to identify the number of bytes provided in a frame for a particular service when byte stuffing is required. Referring to FIG. 2B, the PACKETS data portion of the multiplex frame may be said to further consist of two regions: one region including a MUX Structure Control packet requiring additional forward error correction and a second region requiring now additional forward error correction than the Reed-Solomon coding provided for each row or line (excluding HSYNCH).

Other categories of PACKETS data do not require additional forward error correction. These include video and audio control, seed packets for decryption, cyclic system data, composite virtual channel and definition packets for providing what may be perceived as additional data services, addressed data packets for transmitting messages to addressed decoders, text and utility data packets and other service packets. Additional details of the various PACKETS data may be obtained from U.S. patent application Ser. No. 08/161,160, entitled "System and Method for Transmitting a Plurality of Digital Services Including Imaging Services," filed Dec. 3, 1993 and which is incorporated herein by reference.

Figure 2C:
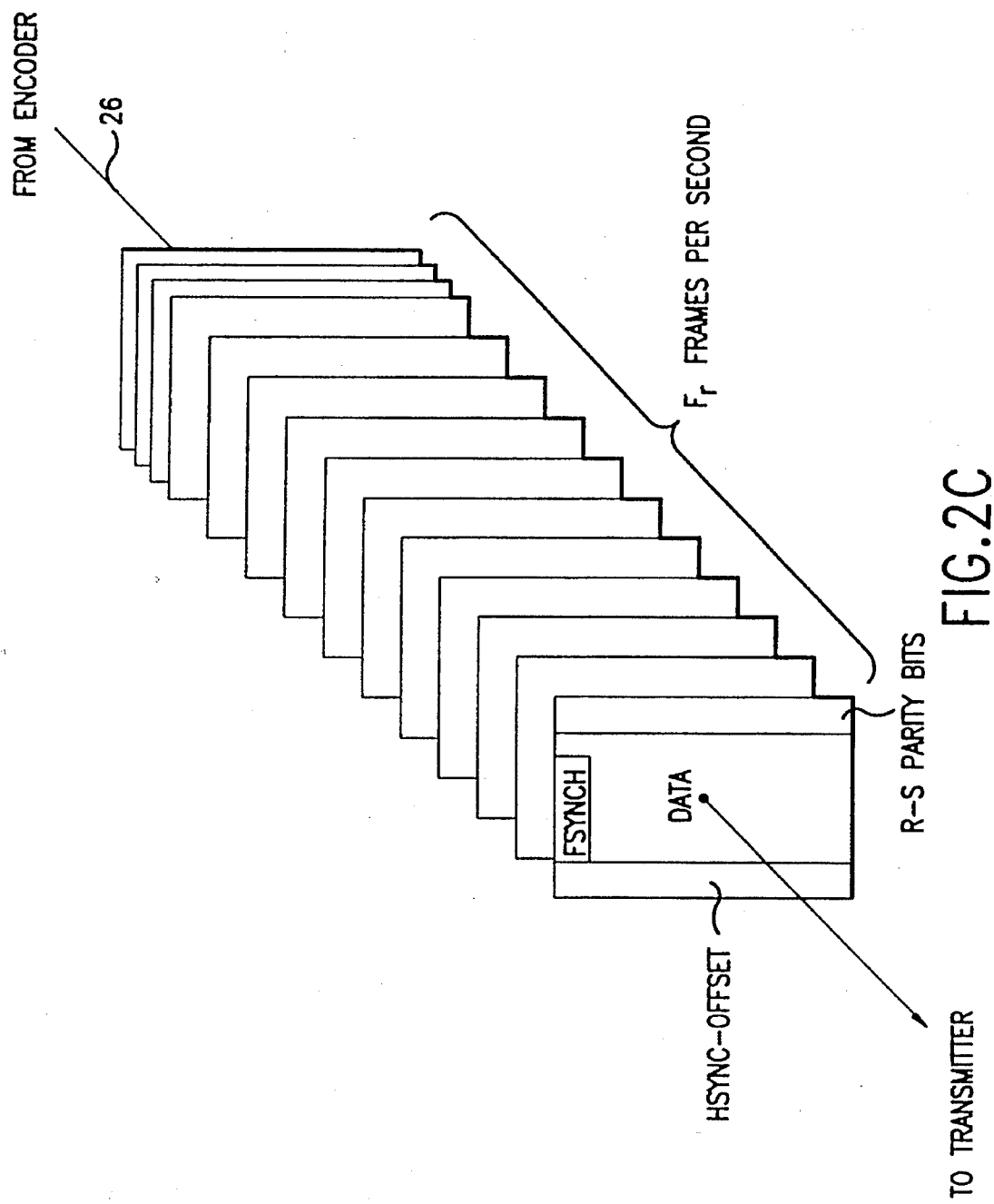
FIG. 2C is a diagram showing that a sequence of frames in the form of FIGS. 2A or 2B are transmitted to a receiver according to the present invention.

FIG. 2C illustrates that a sequence of frames in the form of FIGS. 2A or 2B are transmitted to a receiver according to the present invention. The sequence of frames need not be composed of identical allocation of packets, low speed data, etc. Rather, the content of individual frames may altered by the operator in accordance with the services and authorization control desired.

Figure 3A:
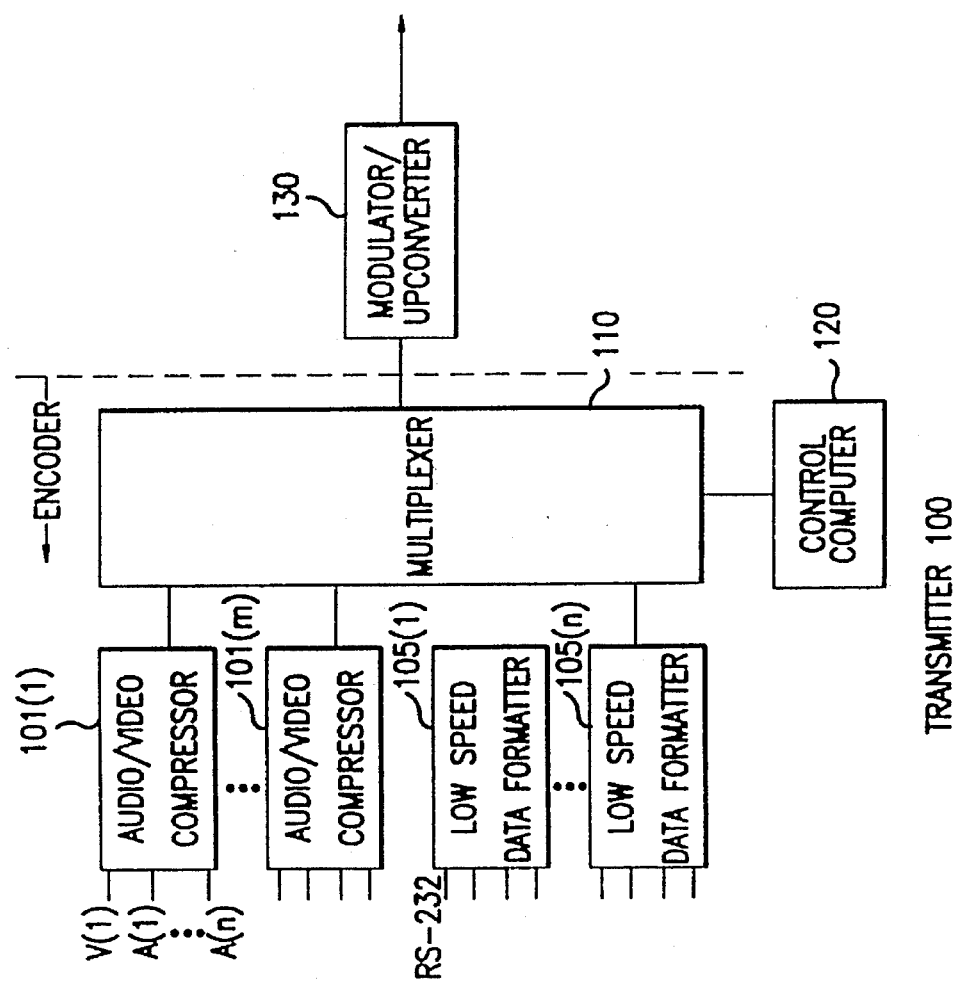
FIG. 3A is an encoder block diagram for one preferred embodiment of a portion of transmitter 100 of FIG. 1 showing the connection of audio and video compressors and low speed data formatters to a multiplexer under control of a control computer for modulation by a modulator on to a carrier for transmission, for example, by satellite as shown in FIG. 1.

Now, an encoder according to the present invention will be further described with reference to FIG. 3A. It has already been described that an encoder according to the present invention typically involves A/V compressors 101(1) to 101(m). Particular suggested capacities for one such A/V compressor, for example, compressor 101(1) are to limit the number of input video streams to 1 and to provide up to a maximum of four audio input streams (or two stereo streams) each comprising left and right input streams.

It has also been described that low speed data formatters 105(1) to 105(n) be provided. Typically, however, each low speed data formatter may handle, for example, sixteen or even thirty-two input data streams. Consequently, it is contemplated that the number of such formatters required will number only 1 or 2. Low speed data formatters typically receive low speed data in a predetermined format, such as RS232, and strip the data of any header data, start data, stop data, parity data and such depending on the predetermined and identified input data stream so that only true information carrying data remains in a serial data stream.

Now, the multiplexer 110 of FIG. 3A will be described in further detail with reference to FIG. 3B. Audio/video service streams A1 to An are received from audio/video compressors at audio/video data buffer 410. Service multiplexer 110 operates to multiplex a plurality of digital service streams for transmission to remote locations. Also shown are inputs to a low speed data buffer 412 from low speed data formatters 105(1) to 105(n). Buffer 410 (audio/video) and buffer 412 for low speed data preferably signal a buffer fullness condition to the next functional element, for example, encryption block 415, if encryption is desired, or on to multiplex frame formatter 418 for low speed data. Encryption block 415 is intended to represent the inclusion of, for example, single or double tiers of encryption in accordance with seeds and keys and particular, predetermined algorithms as required for the digital service streams, for example, in a pay environment.

Other digital data is input from a text/graphics input computer, for example, teletext data to text data processor 416 via computer interface 414 to the service multiplexer 418. Conditional access data, including addressed data packets, global seed and virtual channel packets (or seed packets and composite virtual channel packets), is input, for example, from a billing computer or subscriber service computer for storage in conditional access data buffer 417. Conditional access data typically defines the services, especially pay services, to which a subscriber has subscribed. This data interfaced also via interface 414 is processed and packeted into protect region 1 PACKETS via conditional access data processing block 417 for input to multiplex formatter 418.

Thus, at the output of multiplex (MUX) block 418 is a multiplexed frame structure as described by FIGS. 2A, 2B and 2C. The output digital stream is Reed Solomon encoded according to an appropriate encoding scheme depending on the noise characteristics of the transmission media by a well known Reed Solomon encoder 454. Then, preferably in a highly noisy environment, the frame is interleaved on a byte(s) (rows and columns switching) basis at interleave block 462. Interleave circuit 462 interleaves the data frame by transposing row and column addresses of data within the frame. Lastly, HSYNCH and FRAME SYNCH are inserted into the frame just prior to transmission at synch insert block 458. This data then appears at a receiver at its original location in the frame while all other data is interleaved.

Particular data packets contained in the PACKETS region for implementing authorization control will now be described. The Addressed Data Packet (ADP) is transmitted using 32 byte packets. The ADP is used to provide decoder specific information to the decoder. Each ADP has a USER-ID value of 32 bits which corresponds to the decoder's unique address. The demultiplexer 158 will only select the ADPs which match the decoder's selected USER-ID. Further information concerning the ADP will be discussed below.

Referring briefly to FIG. 4, the Virtual Channel Packet is a 32 byte (256-bit) packet transmitted within the PACKETS region. The VIRTUAL CHANNEL PACKET contains the information required by the decoder to determine where a requested channel actually is located within the various multiplex channels. The present invention will be described in context of one of several fields in the VIRTUAL CHANNEL PACKET. However, it should be understood that the present invention may form part of a different packet or, alternatively, may form a separate packet. The authorization information provided by the present invention may be referred to as "encrypted cycling data" or "cycling data."

FIG. 4 depicts the various fields that comprise one preferred embodiment of a VIRTUAL CHANNEL PACKET. As discussed above, the DCP 153 controls the demultiplexer 158 to extract the VIRTUAL CHANNEL PACKET corresponding to the channel input by the user to KBD 156. The extracted VIRTUAL CHANNEL PACKET is then sent to DISE 157 for decryption and a determination whether the selected channel is authorized. A detailed discussion of the various fields is beyond the scope of this invention. Several of the fields are pertinent to the present invention and will be discussed below.

The ENCRYPTED CYCLE COMMAND carries a code that indicates the type of data contained in the ENCRYPTED CYCLE DATA field. In a preferred embodiment, the ENCRYPTED CYCLE COMMAND is a 4-bit code. However, it should be clear the number of bits required for the ENCRYPTED CYCLE COMMAND may vary depending on the number of types of data contained in the ENCRYPTED CYCLE DATA field.

The present invention preferably includes a WAIT FOR BLACKOUT/SPOTLIGHT CYCLE, which may be e.g., a 1-bit field, that indicates that authorization control is utilized for a particular service (i.e., the selected channel). For example, when the WAIT FOR BLACKOUT/SPOTLIGHT CYCLE is set, the DISE 157 must wait for a complete encrypted cycle describing, for example, the blackout area before authorization is issued. Service will not be available to the user until the complete encrypted cycle is received. When the bit is clear, no blackout is implemented.

The ENCRYPTED CYCLE DATA field carries the cycling data. FIG. 5 illustrates a format for the cycling data having three 8-bit bytes. Of course, the number of bits and bytes used may vary, and the exact format illustrated should not be considered to limit the present invention. The ENCRYPTED CYCLE DATA is delivered to the decoder in a sequence of frames. The ENCRYPTED CYCLE DATA field in each frame must be completely received from start to finish without errors or omissions in order for the authorization to be issued by DISE 157.

The sequence of ENCRYPTED CYCLE DATA is bounded by a START command and is followed by a STOP command, which may also carry a validation word (e.g., checksum). To initiate a transmission of cycling data, a first packet in sequence must contain the START command. The STOP command indicates the end of the sequence. Together, the START and STOP commands frame a data cycle. The START command also initiates the tier authorization cycle and is ended by the STOP command.

In the example illustrated in FIG. 5, the most significant byte is used to indicate the kind of START or STOP command. FIG. 6 illustrates a set of START and STOP command types that may be implemented. Of course, the number and kind of command types depicted in FIG. 6 should not be considered limiting. The STOP command may be used to stop any kind of cycle. Thereafter, the command that is stopped will then be executed by the DISE 157. Several different types of START commands may be implemented depending on the variety of authorization schemes offered. For example, a BLACKOUT START indicates that the receiving decoders should be authorized unless there is a blackout code match. A SPOTLIGHT START indicates that the receiving decoders should not be authorized unless there is a spotlight code match. A TIER POINTER START begins the accumulation of tier words. Additional details concerning the tier words will be provided below.

Referring now to FIG. 5, the middle byte of the START command describes, for example, the length of the cycle. For example, the length field may indicate the number of sessions that the cycle lasts. Alternatively, the middle byte may indicate the number of seconds to wait for authorization. The length field may be provided only in connection with the START command. The least significant byte may define a checksum field, which may be sent only with the STOP command, in order to ensure accuracy. The checksum may correspond to the sum of the data bytes and the ENCRYPTED CYCLE COMMAND value of all commands between the START and STOP commands. The bytes of START and STOP commands need not included when determining the checksum value. An alternative error correction code may also be provided, or none at all.

The BLACKOUT command contains a blackout code which, if it matches a corresponding value stored in the receiving decoder, sets the decoder to "not authorized" regardless of any previous state. A method by which the corresponding value can be stored in the receiving decoder is discussed below. A transmitted BLACKOUT code of zero may be ignored, although it should not be transmitted to avoid delay in authorization.

The SPOTLIGHT command contains a spotlight code. If the spotlight code matches a corresponding value stored in the receiving decoder, the decoder is set to "authorized" regardless of any previous state, assuming all higher priority authorization conditions are satisfied. A method by which the corresponding value can be stored in the receiving decoder is discussed below. A transmitted SPOTLIGHT code of zero may be ignored, although it should not be transmitted to avoid delays in authorization.

The BLACKOUT LOCATION command describes a circular blackout region. If the decoder's location is within the region, the decoder is set to "not authorized" regardless of any previous state. The blackout location may be sent in two frames. The first frame may include the radius of the circular region and latitude of the center location. The second frame may include the longitude of the center location. However, this particular format should not be considered limiting. The circular region may be described in three or more frames or, if desired, in a single frame. In addition, the circular region may be described using other variables and/or co-ordinate systems.

The SPOTLIGHT LOCATION command describes a circular spotlight region. If the decoder's location is within the region, the decoder is set to "authorized" regardless of any previous state, assuming all higher priority authorization conditions are satisfied. The spotlight location is transmitted, for example, in two data frames. The first frame may provide the radius and latitude and the second frame may provide the longitude. As above, this particular format should not be considered limiting.

The system described is intended to provide flexible control of blackout and/or spotlight authorization for national or even international applications. The dual blackout and spotlight type are intended for two different requirements. However, the different blackout/spotlight types may interact. The BLACKOUT/SPOTLIGHT codes are intended for regional segregation, e.g. city, county, state, or country, any combination of one or more, and/or according to any other classification schemes. Authorization codes, for example four or more, may be stored within the decoder to allow authorization control on the basis of several classifications. The transmission side can then send a list of counties which are to be blacked out, or blackout an entire state except for one county.

The BLACKOUT/SPOTLIGHT LOCATION codes are intended for circular blackout or spotlight regions. Each decoder can be in one location, defined as a location on the surface of the Earth, e.g. using longitude and latitude. The transmission side can indicate circular regions and the decoder decides if it is within the indicated region. If it is, the decoder blacks out or spotlights the selected service depending on the command sent. If the blackout and spotlight systems reside and operate together, the operator may, for example, use a circular region for blackout centered on a stadium and then explicitly spotlight nearby counties. This feature of the present invention will be discussed in greater detail below.

The START command may also implement an initial state for the transmission cycle. A blackout cycle may start with all decoders authorized, and then a list of spotlight codes can be sent. Thus, the order of transmission would be important for determining the authorization at a particular decoder. In either initial state, both spotlight and blackout codes can be transmitted. The DISE 157 in the decoder may simply maintain one bit representing whether the service is authorized or not. For example, the START command may set or clear the authorization bit corresponding to a particular service. As each command is received, the authorization bit can be set to the other state. 0f course, the DISE 157 may wait for the entire cycle to be received before it releases authorization seeds regardless of the initial state. In fact, the WAIT FOR BLACKOUT/SPOTLIGHT CYCLE field may be provided to ensure that authorization is not implemented until the full cycle is received. If the WAIT FOR BLACKOUT/SPOTLIGHT CYCLE bit is clear, for example, the cycle is ignored and the DISE 157 can immediately authorize the service if allowed.

As discussed above, the present invention may be implemented so that the complete cycle needs to be received without error before authorization can be established. A checksum command may be used to verify the entire cycle, but provision of a checksum complicates the software. Alternatively, the Reed-Solomon section and/or the virtual channel packet check may be used to flag the loss of data.

In one preferred embodiment, the packet containing the cycling data, e.g., the virtual channel packet, is transmitted once per session. A "session" is the time for which an authorization sequence is valid. As such, a session is a software requirement, and hardware support is added to enable a session to be implemented. According to one preferred embodiment of the present invention, a session may comprise 13 frames and have a duration of about 0.25 sec. Therefore, transmission of one blackout cycle, having one START, two data packets, and one STOP, takes about one second. However, this should not be considered to limit the present invention. A session may be selected to ensure enough time to decrypt all conditional access data, but not too long to delay authorization. In one preferred embodiment, video and audio will not start until the first session after seeds have been calculated and stored in the demultiplexer 158.

System hardware maintains a session count for software reference. When the session count is zero, the decryptors are re-initialized. The session counter may be variable (e.g. 0 to 63) so that the session length may be increased or decreased depending on how long the DISE requires to calculate authorization. In addition, seeds for all encryptors are maintained over multiple data frames.

All of the authorization data may be distributed over the course of a session. For example, global seed may be placed in frame 1, global system data may be placed in frame 2, virtual channel packets may be placed in any of frames 0–3, and ADPs may be placed in any frame. Of course, this is intended merely as an example and should not be considered limiting. For example, any placement that is efficient for the DISE may be implemented. In one preferred embodiment, only one virtual channel packet for each virtual channel is sent per session. Accordingly, only one cycling data packet will be received that session.

As described above, the cycling data may provide specific authorization in addition to that provided by system data such as global system data, global seed, and virtual channel packets. Thus, the cycling data may be optional in the sense that it is not necessary for authorization, but is rather an extra stream for particularized authorization control. In fact, the virtual channel packet may include a VIDEO/RADIO/TEXT TIER POINTER that may be used if a tier cycle is not implemented. When the cycling data is not enabled, authorization time can be minimized.

In unidirectional communication system, for example, it is sometimes necessary to repeat a session of data. This would normally disrupt the cycle sequence thereby causing an error which would lead to the discard of the entire cycle. To prevent this, a sequencing bit may be added that toggles for every new word transmitted in the cycle. Accordingly, the decoder can detect when new information is transmitted and, for example, ignore repeated data in a subsequent session by waiting for the sequencing bit to change before accepting the next entry in the cycle. Accordingly, cycling data may be repeated to ensure its reception. This sequencing bit may be contained in the virtual channel packet, or other packet that includes the encrypted cycling data.

For example, FIG. 4 shows that the virtual channel packet includes a CYCLING DATA ID BIT which may be used to toggle each time new ENCRYPTED ENCYCLING DATA bytes are transmitted. The sequencing bit may also allow the decoder to merge multiple virtual channel packets without resulting error. For example, in decoders that may not require the repeat of data yet nonetheless receive the ENCRYPTED ENCYCLING DATA more than once, the checksum calculation may indicate an error. Accordingly, the CYCLING DATA ID BIT can help to determine the correct checksum as well as determine when data can be used.

The video/radio/text tier pointer cycle is used to emulate the B-MAC Group Mode authorization (i.e., CSACS packets) using a tiered system. This is done by transmitting a list of tiers pointers to each decoder instead of one tier pointer as in the B-MAC implementation. Tiers are stored in the DISE of each decoder, and a tier pointer indexes ("points") to one bit in the bit tier. If that bit is in a first state, e,g., "1", the decoder will authorize for the serviced described by the virtual channel packet. If the bit pointed to is in a second state, e.g., "0", authorization is denied. When a plurality of tier pointers are transmitted, the decoder will authorize service if any of the bits pointed to are, e.g., "1". The decoder can thus be authorized in a group-like scheme. According to one embodiment of the present invention, service is described by the virtual channel packet and may include video, audio, text, or data authorization.

The virtual channel packet may include a VIDEO/RADIO/TEXT TIER POINTER which indexes a bit string in the DISE 157. The VIDEO/RADIO/TEXT TIER POINTER may be for example 8-bits. However, the actual number of bits in the VIDEO/RADIO/TEXT TIER POINTER may depend on the number of bits in the bit string in the DISE 157. If the bit pointed to is, for example, set, the virtual channel is automatically authorized, unless deauthorized by some overriding priority such as parental rating. The VIDEO/RADIO/TEXT TIER POINTER applies to all services which share, for example, the video and audio system.

The virtual channel packet may also include a INVERSE TIER AUTHORIZATION field, which may be, for example, a 1-bit field. The INVERSE TIER AUTHORIZATION field may be used to affect the way the VIDEO/RADIO/TEXT TIER POINTER is processed. When the INVERSE TIER AUTHORIZATION is in a first state, the decoder is authorized at the end of the cycle if a tier pointer points to a bit in the DISE that is set. When the INVERSE TIER AUTHORIZATION is in a second state, the decoder is authorized unless the tier pointer points to a bit that is set, in which case the decoder is deauthorized at the end of the cycle. In either case, the result of ORing all of the tier bits may be used to determine authorization. If the encrypted cycle is enabled, all tier cycle bits must be received before authorizing, even in an inverse mode. The state of the INVERSE TIER AUTHORIZATION at the start of the cycle determines the state for the entire cycle. Any change to the INVERSE TIER AUTHORIZATION can only apply to the next complete cycle. The INVERSE TIER AUTHORIZATION may be applied to the main tier pointer VIDEO/RADIO/TEXT TIER POINTER as well as the cycling tier pointers.

The virtual channel packet may also include a WAIT FOR VIDEO/AUDIO/TEXT TIER POINTER CYCLE which may be e.g., a 1-bit field, that indicates that the DISE may wait for a completed tier cycle when in a first state, e g. "1". When in a second state, e.g., "0", only the main tier pointer would be used for authorization. The main tier pointer and the cycling tier pointers, if enabled, point to a tier bit. When this pointed to bit is in a second state, the decoder will not become authorized. When the bit pointed to is in a first state, the decoder will become authorized, and no further bits will deauthorize the decoder. This then is the logical OR of all tier bits pointed to. If all of the bits pointed to are in the second state, the decoder remains unauthorized. If any one of the bits pointed to is in a first state, the decoder will be authorized.

The video/radio/text tier pointer START command initiates a cycle of tier pointers. The tier pointer may comprise three 8-bit bytes depending on the bit space allocated for the ENCRYPTED CYCLING DATA in, for example, the virtual channel packet. If any of the, for example, three 8-bit tier pointers contained in the ENCRYPTED CYCLING DATA field point to a bit of the DISE that is in a first state (e.g., "1"), the decoder becomes authorized when the STOP command is received. An authorized decoder would become deauthorized if a STOP command is received for the tier cycle and no tier pointer pointed to a bit in the DISE that is in the first state.

In the above example of the present invention, there are three tier pointers in any one data packet. If only one or two tiers remain to be sent, a previous tier pointer may be repeated to fill in the unused locations. This may be required according to some implementations to avoid inadvertently pointing to a valid bit in the DISE and thereby authorizing service.

The method of calculating the circular blackout/spotlight region according to the present invention will now be described. As discussed above, the location of a circular blackout/spotlight region is transmitted in the ENCRYPTED CYCLE DATA field by specifying a radius and by specifying a point on Earth using longitude and latitude. However, each decoder must also store its own location as discussed above.

FIG. 7 illustrates a decoder authorization addressed data packet (ADP) that is transmitted to each decoder individually. The particular format may vary consistent with the principles of the present invention. According to FIG. 7, each decoder receives and stores in the DISE 157 four blackout codes contained in the fields BLACKOUT CODE #1–#4 when the STORE BLACKOUT CODES field is, for example, "1". However, it should be clear that any number of blackout codes may be transmitted and stored consistent with the present invention. Any non-zero value for the blackout codes is compared by the DISE 57 against the BLACKOUT codes contained in the ENCRYPTED CYCLE DATA field of received virtual channel packets that follow. If there is a match, the blackout/spotlight is implemented. Blackout is implemented, e.g., by denying authorization. On the other hand, spotlight can be implemented by proceeding with authorization.

The physical location of the decoder may be encoded using standard latitude and longitude position in minutes, for example, and transmitted in the DECODER LOCATION-LATITUDE and DECODER LOCATION-LONGITUDE fields of the ADP. The DISE 157 will store the decoder location when the STORE DECODER LOCATION field is, for example, "1". If the decoder is within the radius of a circle transmitted in the ENCRYPTED CYCLE DATA field of the virtual channel packet, the decoder blacks out or spotlights the service. The decoder processes the fields of the ADP and any transmitted codes of the virtual channel packet only if the USE DECODER LOCATION field is, for example, "1". Thus, the USE DECODER LOCATION field will indicate whether the circular blackout/spotlight function is utilized in an individual decoder.

If the latitude and longitude identifications are accurate to a one minute arc, there is 21,600 divisions (360 degrees * 60 minutes/degree) radially. If the radius is always provided in the same units (i.e., minutes), a maximum circle of about 293 miles would be described. However, the particular units of latitude, longitude, and radius are provided as examples and should not be considered to limit the present invention. Of course, the radius may easily be converted to other units, for example kilometers, if the operator so prefers.

The present invention includes a distortion code transmitted to the decoder based upon its location. For example, the distortion code may be transmitted in the DECODER LATITUDE COMPENSATION field of the decoder authorization ADP. The distortion code permits the approximation of a circle on a surface in three dimensional space (i.e., the earth's surface) using a two dimensional coordinate system of latitude and longitude.

As discussed above, a circular blackout/spotlight is described by a distance from a point on earth, i.e. the distance between the decoder and the center of the blackout/ spotlight circular region. The actual distance follows an arc along the Earth's surface between the center of the blackout/ spotlight circle and the decoder location. If the distance were calculated in the decoder, trigonometric functions and extensive use of multiplication and division operations would be required. One principle of the present invention is to shift the burden of performing the complicated mathematics from the decoder to the encoder. Accordingly, the encoder may output one simple number, the distortion code. As a result, only four multiplications ($r^2$, $(A-X)^2$, $(B-Y)^2$, and dist * $(A-X)^2$, as will be seen below) and a few additions and subtractions need be performed at the decoder, thereby saving processor time at the decoder.

The particular algorithm for calculating the distortion code will now be discussed. The algorithm is preferably stored in the ROM of DISE 157. The approximate distance between two points on earth can be calculated from the following expression:

$$Q^2 = \cos^2(B) * (A-X)^2 + (B-Y)^2 \quad (1)$$

where:

Q is a distance expressed in minutes of arc;

(A,B) are the decoder location co-ordinates in minutes of latitude and longitude; and (X,Y) are the co-ordinates of the center of the circle in minutes of latitude and longitude.

If r represents the radius of the blackout/spotlight region in minutes, the decoder is outside of a circular region if both of the following expressions are true:

$$r < ABS(B-Y) \quad (2)$$

$$r < ABS(A-X) \quad (3)$$

However, the decoder may still be outside of the blackout/ spotlight region even if one or both of expressions (2) and (3) are not true. When the decoder is within the circle, the following expression is true:

$$r^2 > \text{dist} * (A-X)^2 + (B-Y)^2 \quad (4)$$

The distortion factor is defined as:

$$\text{dist} = \cos^2(B) \quad (5)$$

The distortion factor $\cos^2(B)$ is transmitted to the decoder in the ADP. Therefore, the decoder can perform the simplified circular blackout/spotlight determination. Accordingly, if the decoder within a circular blackout region, authorization of the service will be denied. If the decoder is not within the circular blackout region, service will be authorized if higher priority authorization conditions are met. On the other hand, if the decoder is within a circular spotlight region, service will be authorized provided higher priority conditions are met. If the decoder is not within the circular spotlight region, authorization of service will be denied. In a preferred embodiment, the calculation of the circular blackout/spotlight is performed in the DISE 157. However, the calculation may be performed in a non-secure microprocessor, for example DCP 153, or an application specific integrated circuit (ASIC) such as demultiplexer 158.

Figure 8:
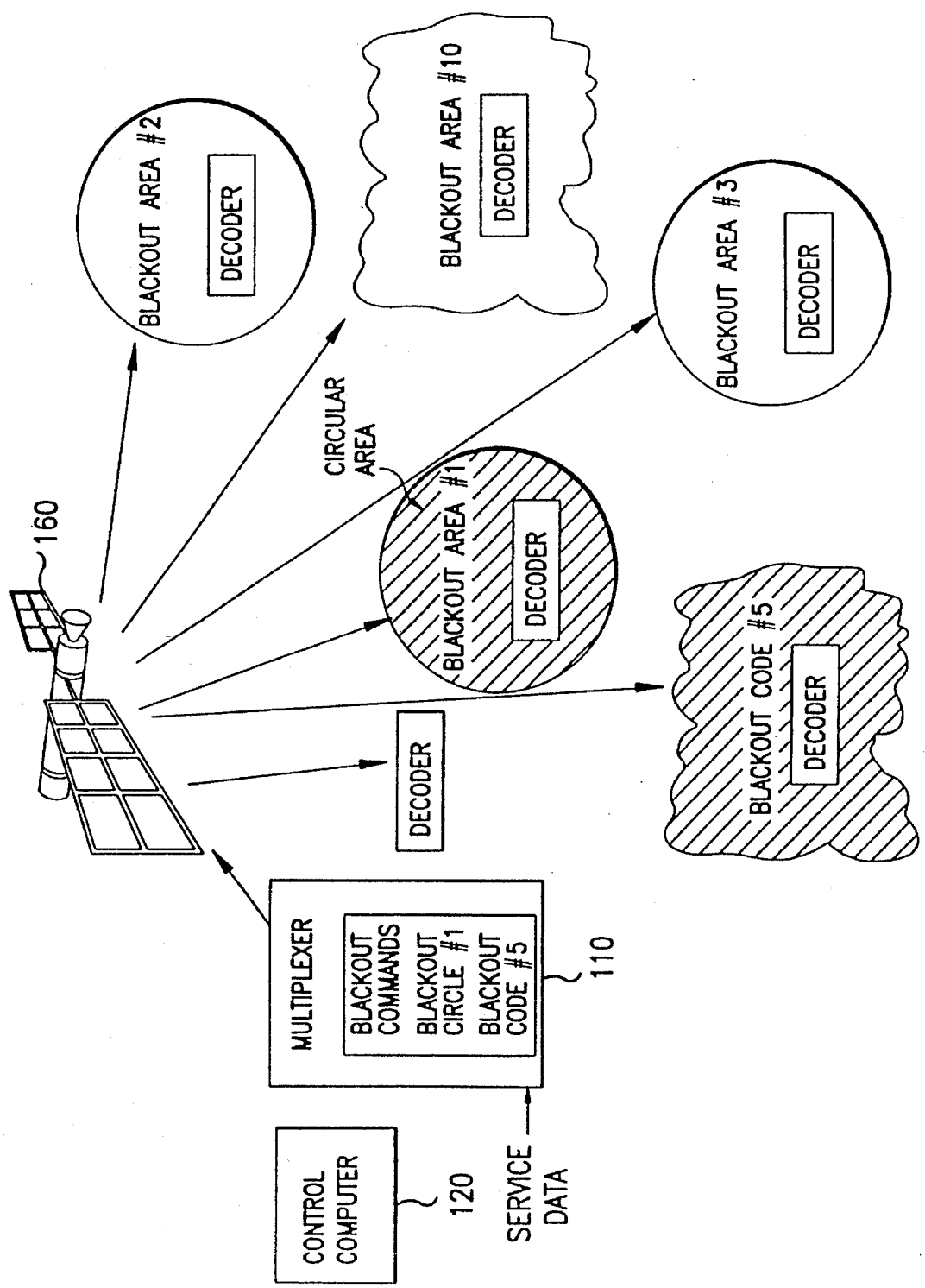
FIG. 8 illustrates an example of the use of BLACKOUT codes in combination with BLACKOUT LOCATION codes.

FIG. 8 illustrates an example of the use of BLACKOUT codes in combination with BLACKOUT LOCATION codes. Initially, the control computer 120 must transmit the blackout codes and decoder location for storage in the DISE 157 of an individual decoder. This is accomplished by transmitting blackout codes and decoder location in an ADP using the BLACKOUT CODES, the DECODER LOCATION, and the DECODER LATITUDE COMPENSATION fields. This may occur at any time prior to the desired blackout authorization. The decoders receive their respective ADPs and store the data in the BLACKOUT CODES, the DECODER LOCATION, and the DECODER LATITUDE COMPENSATION fields. Accordingly, the decoders are initialized to implement both regional and circular authorization control.

As depicted in FIG. 8, an operator can blackout a service to a particular circular area (referred to as blackout circle #1) as well as to a particular region (corresponding to blackout code #3) by entry of an appropriate instruction set in control computer 120. The control computer 120 formats the instructions, for example, into a sequence of virtual channel packets, which is multiplexed in to a sequence of frames together with the transmitted services. The sequence of multiplexed frames which are transmitted via a satellite to receivers 150 in a variety of locations.

Decoders receive the sequence of frames and send the blackout information to their respective DISE 157 to determine authorization. DISE 157 calculates whether the decoder is within the blackout circle #1 and whether it is within the blackout region defined by blackout code #3. Decoders within circular blackout region #1 or the region corresponding to blackout code #5 will not be authorized. Decoders in other areas, such as blackout areas #2 and #3 and the region corresponding to blackout code #10, will be authorized.

Figure 9:
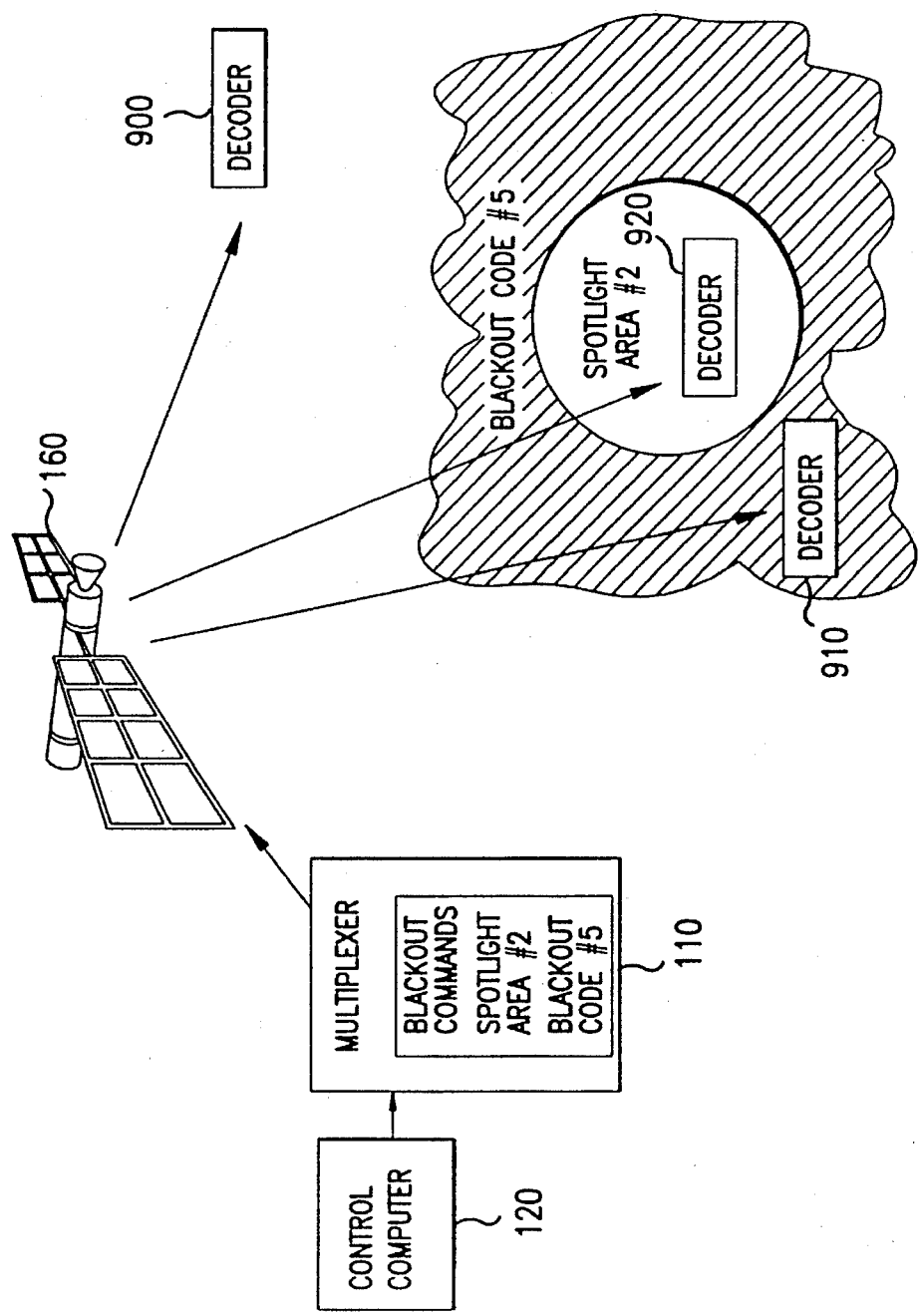
FIG. 9 illustrates an example of the interaction of overlapping blackout and spotlight commands.

FIG. 9 illustrates an example of the interaction of overlapping blackout and spotlight commands. As in FIG. 8, an operator may enter appropriate instructions to control computer 120 to generate a plurality of data packets which are multiplexed into a sequence of frames together with service data by multiplexer 110. The sequence of frames is transmitted to various decoders via satellite 160. In this example, the spotlight circle #2 defines a circle within the area defined by blackout code #5. Accordingly, decoders outside of the region defined by blackout area #5, e.g., decoder 900, will be authorized. Decoders within the region defined by blackout code #5, e.g., decoders 910 and 920, will initially be deauthorized. However, decoders within spotlight circle #2, e.g., decoder 920, will be authorized when the spotlight information is processed by the decoder.

While the present invention has been disclosed with respect to a preferred embodiment and modifications thereto, it is to be understood that the invention is not limited to the precise embodiments and that various changes and modifications may be effected therein by those in the art without departing from the scope and spirit of the invention.

We claim:

1. In a receiver of a communication system for receiving digital data streams defining a plurality of services, said digital data streams being multiplexed in each of a sequence of frames and said sequence of multiplex frames being divided into a plurality of sessions, wherein the multiplex frames further include first authorization control information for authorizing the plurality of services defined by said digital data streams and second authorization control information for providing additional authorization control, and wherein said first authorization control information is included in the multiplex frames of each session, and said second authorization control information comprises a plurality of portions distributed over the multiplex frames of more than one session, wherein said second authorization control information included in any one session is insufficient to authorize a service for any receiver in said communication system, an apparatus for determining authorization of said services defined by at least one of said digital data streams comprising:

a selector for selecting a service defined by at least one of said digital data streams;

extracting means, responsive to said selector, for extracting the first and second authorization control information corresponding to said at least one digital data stream from the multiplex frames of more than one session; and a security element for determining whether the selected service is authorized using the first authorization control information and the second authorization control information extracted from the frames of more than one session.

2. An apparatus according to claim 1, wherein said security element, using said extracted second authorization control information, implements a plurality of authorization modes to determine whether the selected service is authorized.

3. An apparatus according to claim 2, wherein the second authorization control information comprises authorization commands and authorization data specific to one of said plurality of the authorization modes implemented by said security element.

4. An apparatus according to claim 3, wherein the authorization commands and authorization data specify a circular blackout region and wherein said security element implements a circular blackout authorization mode.

5. An apparatus according to claim 3, wherein the authorization commands and authorization data specify a circular spotlight region and wherein said security element implements a circular spotlight authorization mode.

6. An apparatus according to claim 3, wherein the authorization commands and authorization data specify a blackout group and wherein said security element implements a blackout group authorization mode.

7. An apparatus according to claim 3, wherein the authorization commands and authorization data specify a spotlight group and wherein said security element implements a spotlight group authorization mode.

8. An apparatus according to claim 3, wherein the authorization commands and authorization data specify a tier authorization field and wherein said security element implements a tier authorization mode.

9. An apparatus according to claim 8, wherein:

said security element comprises memory for storing a string of values, wherein each value corresponds either to a first or a second state; and the authorization data comprises a tier pointer that indexes a value of said string of values stored in said memory, wherein said security element determines that the selected service is authorized if the value indexed by the tier pointer corresponds to the first state and determines that the selected service is not authorized if the value indexed by the tier pointer corresponds to the second state.

10. An apparatus according to claim 8 wherein:

said security element comprises memory for storing a string of values, wherein each value corresponds either to a first or a second state; and the authorization data comprises a plurality of tier pointers that each index a value in the string of values stored in said memory, wherein said security element determines that the selected service is authorized if any value indexed by the plurality of tier pointers corresponds to the first state and determines that the selected service is not authorized if each of the tier pointers index values corresponding to the second state.

11. An apparatus according to claim 3, the length of said authorization data being variable in the number of bytes.

12. An apparatus according to claim 11, wherein the variable-byte length authorization data is preceded by a START authorization command in a first session and is followed by a STOP authorization command in a succeeding session.

13. An apparatus according to claim 1, wherein each of the sequence of frames includes packets data, medium speed data, and high speed data, the first and second control authorization information being contained in the packets data and the digital data streams being contained in at least the medium speed data and the high speed data.

14. An apparatus according to claim 13, wherein the second control authorization information is included in distinct packets of said packets data.

15. An apparatus according to claim 14, wherein the distinct packets are of fixed length and said second control authorization information is contained in the distinct packets of frames in a variable number of sessions.

16. An apparatus according to claim 1, wherein said access information output by said security element comprises location information concerning the location of a portion of said at least one data stream in each frame.

17. An apparatus according to claim 1, wherein said at least one digital data stream is encrypted and wherein:

said security element comprises means for providing decryption information corresponding to said at least one digital data stream to said extracting means if the selected service is authorized; and said extracting means comprises decrypting means for decrypting said at least one digital data stream defining said selected service using said decryption information.

18. An apparatus according to claim 1, wherein said at least one digital data stream is encrypted and wherein:

said security element comprises means for providing decryption information corresponding to said at least one digital data service to said extracting means if the selected service is authorized; and said extracting means comprises decrypting means for decrypting said at least one digital data stream using said decryption information.

19. An apparatus according to claim 1, wherein the second authorization control information comprises information defining a circular region including a location of a center point and a radial distance from the center point and wherein said security element comprises:

storing means for storing information defining a location of the receiver and a geographic distortion factor; and computing means for computing whether the receiver location is within the circular region on the basis of the center point, the radial distance, the location of the receiver, and the geographic distortion factor; and wherein said security element determines whether the selected service is authorized based upon whether the receiver location is within the circular region.

20. An apparatus according to claim 19, wherein the second authorization control information defines a blackout circular region and wherein said security element determines that the selected channel is not authorized if the receiver location is computed to be inside of the blackout circular region.

21. An apparatus according to claim 19, wherein the second authorization control information defines a spotlight circular region and wherein said security element determines that the selected channels is not authorized if the receiver location is computed to be outside of the spotlight circular region.

22. An apparatus according to claim 19, wherein said computing means computes that the receiver location is within the circular region if:

$$r^2 > \cos^2(B)*(A-X)^2+(B-Y)^2$$

where:

r is the radial distance;

(A,B) define the location of the receiver;

(X,Y) define the center point; and $\cos^2(B)$ is the geographic distortion factor.

23. An apparatus according to claim 1, wherein said selector comprises a channel selector.

24. An apparatus according to claim 15, wherein the distinct packet in the first frame containing second authorization control information includes a START command and the distinct packet of the last frame containing second authorization control information includes a STOP command.

25. An apparatus according to claim 1, the length of said second authorization control information being variable in the number of bytes.

26. An apparatus according to claim 25, wherein said security element determines whether the selected service is authorized only after said second control authorization information is received in its entirety.

27. An apparatus according to claim 26, wherein the variable-length second authorization control information comprises a START authorization command in a first session and a STOP authorization command in a last session.

28. A method for operating a receiver in a communication system, comprising:

receiving information defining a receiver location and a geographic distortion factor;

receiving signals representative of service signals;

receiving information defining a circular region including a location of a center point and a radial distance from the center point;

determining whether the receiver is located within the circular region using the receiver location, the geographic distortion factor, the center point, and the radial distance; and outputting said service signals depending on whether the receiver is determined to be located within the circular region.

29. A method according to claim 28, wherein said service signals are output only if the receiver is located outside of the circular region.

30. A method according to claim 28, wherein said service signals are not output unless the receiver is located inside of the circular region.

31. A method according to claim 28, wherein the receiver is determined to be located within the circular region if:

$$r^2 > \cos^2(B)*(A-X)^2+(B-Y)^2$$

where:

r is the radial distance;

(A,B) define the location of the receiver;

(X,Y) define the center point; and $\cos^2(B)$ is the geographic distortion factor.

32. A method according to claim 28, wherein said received signals representative of service signals are encrypted and further comprising the steps of:

decrypting said received signals depending on whether the receiver is determined to be located within the circular region.

33. A method according to claim 28, wherein said received signals are included in a multiplex of signals and further comprising the step of:

extracting said received signals from said multiplex of signals depending on whether the receiver is determined to be located within the circular region.

34. A method according to claim 33, wherein said received signals representative of service signals are encrypted and further comprising the step of:

decrypting said received signals depending on whether the receiver is determined to be located within the circular region.

* * * * *